US008155191B2

(12) United States Patent
Lu et al.

(10) Patent No.: US 8,155,191 B2
(45) Date of Patent: Apr. 10, 2012

(54) METHOD AND APPARATUS FOR FAST MODE DECISION OF B-FRAMES IN A VIDEO ENCODER

(75) Inventors: Xiaoan Lu, Brooklyn, NY (US); Peng Yin, West Windsor, NJ (US); Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1379 days.

(21) Appl. No.: 11/666,780

(22) PCT Filed: Nov. 2, 2005

(86) PCT No.: PCT/US2005/039596
§ 371 (c)(1),
(2), (4) Date: May 1, 2007

(87) PCT Pub. No.: WO2006/052577
PCT Pub. Date: May 18, 2006

(65) Prior Publication Data
US 2008/0008242 A1    Jan. 10, 2008

Related U.S. Application Data

(60) Provisional application No. 60/624,870, filed on Nov. 4, 2004.

(51) Int. Cl.
*H04N 11/04*    (2006.01)
(52) U.S. Cl. ......... 375/240.15; 375/240.13; 375/240.14; 375/240.16; 375/240.17; 375/287; 375/317; 375/254; 375/E7.148; 375/E7.17; 375/E7.176; 375/E7.224; 380/210; 380/211; 380/212; 380/269

(58) Field of Classification Search .................. 380/269, 380/11, 12, 210–212; 375/240.13–240.17
See application file for complete search history.

(56) References Cited

U.S. PATENT DOCUMENTS

| 6,529,631 | B1 * | 3/2003 | Peterson et al. .............. 382/232 |
| 6,782,052 | B2 | 8/2004 | Sun et al. |
| 7,233,621 | B2 * | 6/2007 | Jeon .......................... 375/240.15 |
| 7,469,070 | B2 * | 12/2008 | Winger ......................... 382/239 |
| 7,526,027 | B2 * | 4/2009 | Sekiguchi et al. ....... 375/240.16 |
| 2003/0099292 | A1 * | 5/2003 | Wang et al. .............. 375/240.12 |
| 2004/0057515 | A1 * | 3/2004 | Koto et al. ............... 375/240.14 |
| 2004/0114817 | A1 | 6/2004 | Jayant et al. |
| 2004/0131121 | A1 | 7/2004 | Dumitras et al. |
| 2004/0218674 | A1 * | 11/2004 | Kondo et al. ............ 375/240.16 |
| 2005/0013359 | A1 * | 1/2005 | Srinivasan ............... 375/240.03 |

(Continued)

OTHER PUBLICATIONS

Zongju et al., A Fast Multiview Video Coding Algorithm Based on Dynamic Multi-Threshold, Aug. 18, 2009, IEEE.*

(Continued)

*Primary Examiner* — Taghi Arani
*Assistant Examiner* — Josnel Jeudy
(74) *Attorney, Agent, or Firm* — Robert D. Shedd; Paul P. Kiel; Guy H. Eriksen

(57) ABSTRACT

There are provided video encoders and corresponding methods for performing fast mode decision of B-frames. A video encoder for encoding video data for a B slice that is divisible into macroblocks includes an encoder (OO) for performing mode selection when encoding a current macroblock in the B slice by counting a number of neighboring macroblocks in the B slice coded in a DIRECT mode, and only checking one of the DIRECT MODE or a 16×16 mode for the current macroblock when the number of neighboring macroblocks coded in the DIRECT mode exceeds a predetermined threshold.

2 Claims, 5 Drawing Sheets

U.S. PATENT DOCUMENTS

| | | |
|---|---|---|
| 2005/0025249 A1 | 2/2005 | Zhao et al. |
| 2005/0175099 A1* | 8/2005 | Sarkijarvi et al. ....... 375/240.16 |
| 2007/0127579 A1* | 6/2007 | Dumitras et al. ........ 375/240.27 |
| 2007/0140338 A1* | 6/2007 | Bhaskaran et al. ...... 375/240.12 |
| 2008/0069211 A1* | 3/2008 | Kim et al. ................ 375/240.13 |

OTHER PUBLICATIONS

Khan, N. et al: "Efficient scheme for motion estimation and block size mode selection in H. 264", Communications and Information Technology, 2004, ISCIT 2004, IEEE Int'l. Symposium in Sapporo, Japan, Oct. 26, 2004, pp. 741-751, XP010783481.

Lee, J. et al: "Fast Mode Decision for B slice", Joint Video Team (JVT) of ISO/IEC MPEG & ITU-T VCEG, 11th Mtg., Munich, DE, Mar. 15, 2004, XP002369102.

Liang, Y. J. et al: "Low-Complexity Intra/Inter Mode-Decision for H. 264/AVC Video Coder", Intelligent Multimedia, Video and Speech Processing, Proceedings of 2004 Int'l Symposium—Hong Kong, China, IEEE, Oct. 20, 2004, pp. 53-56, XP010801382.

Yang, M. et al: "Fast macroblock mode selection based on motion content classification in H. 264/AVC", Image Processing, 2004, ICIP '04, Int'l Confererence in Singapore, IEEE, Oct. 24, 2004, pp. 741-744, XP010785109.

Zhou, Z. et al: "Fast macroblock inter mode decision and motion estimation for H. 264/MPEG-4 AVC", Image Processing, 2004, ICIP '04, 2004 Int'l. Conference in Singapore, IEEE, Oct. 24, 2002, pp. 789-792, XP010785121.

International Search Report, dated Jun. 6, 2006.

\* cited by examiner

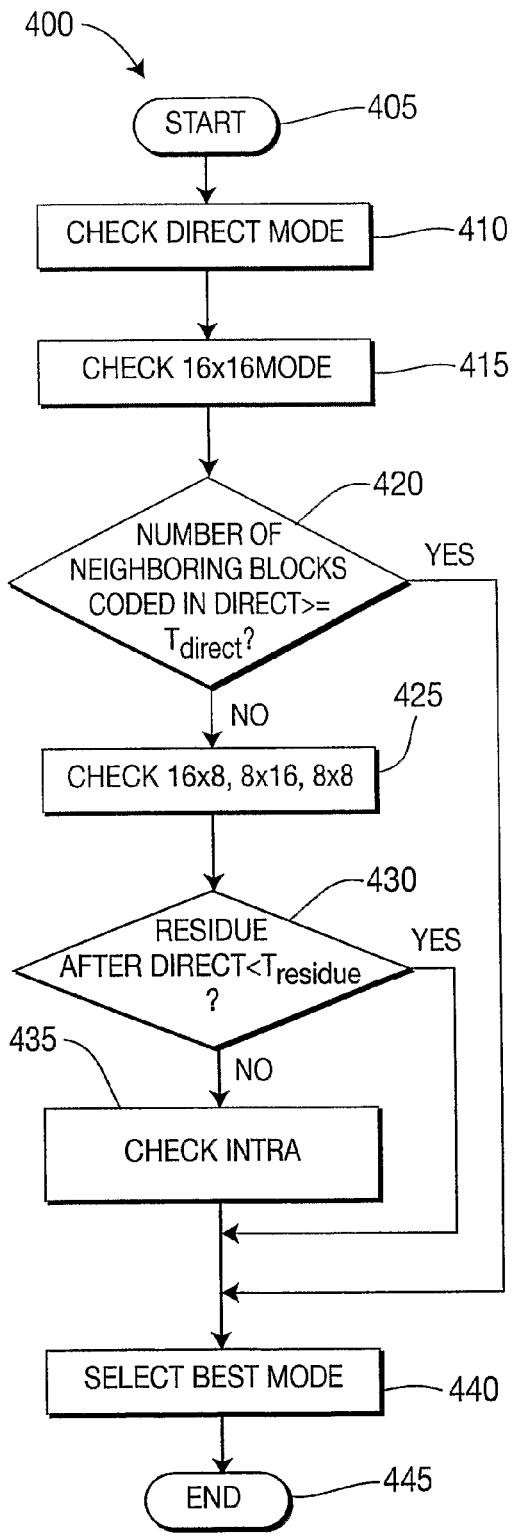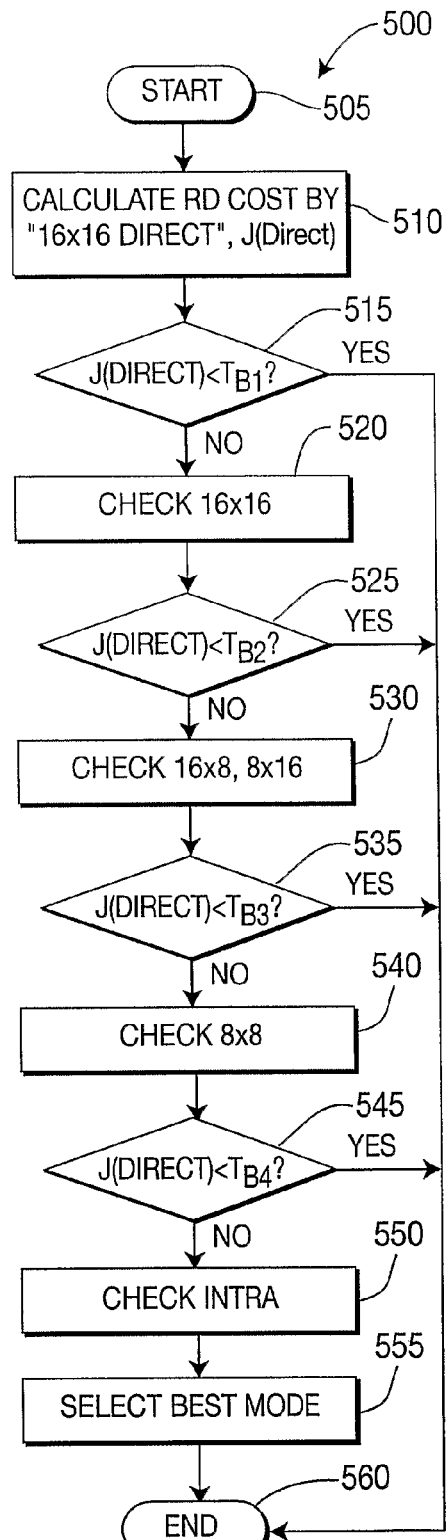
*FIG. 4*   *FIG. 5*

METHOD AND APPARATUS FOR FAST MODE DECISION OF B-FRAMES IN A VIDEO ENCODER

CROSS-REFERENCE TO RELATED APPLICATIONS

This application claims the benefit, under 35 U.S.C. §365 of International Application PCT/US2005/039596, filed Nov. 2, 2005, which was published in accordance with PCT Article 21(2) on May 18, 2006 in English and claims priority of 60/624,870 filed Nov. 4, 2004.

FIELD OF THE INVENTION

The present invention relates generally to video encoders and, more particularly, to a method and apparatus for fast mode decision for B-frames in an encoder.

BACKGROUND OF THE INVENTION

Inter and intra coding methods can both be used to encode interframes (P and B frames) in video compression standards. Intra coding uses spatial correlation while inter coding uses temporal correlation from previously coded frames. In general, inter coding is used for macroblocks that are well predicted from previous pictures, and intra coding is used for macroblocks that are not well predicted from previous pictures, or for macroblocks with low spatial activity. Typically, an encoder may make an inter/intra coding decision for each macroblock, slice, picture, field, and/or frame based on coding efficiency and subjective quality considerations. In the JVT/H.264/MPEG AVC ("H.264") standard, inter coding allows various block partitions and multiple reference pictures to be used for predicting a macroblock.

The H.264 standard uses tree-structured hierarchical macroblock partitions. Inter-coded 16×16 pixel macroblocks may be further broken into macroblock partitions, of sizes 16×8, 8×16, or 8×8. Macroblock partitions of 8×8 pixels are also known as sub-macroblocks. Sub-macroblocks may be further broken into sub-macroblock partitions, of sizes 8×4, 4×8, and 4×4. An encoder may select how to divide the macroblock into partitions and sub-macroblock partitions based on the characteristics of a particular macroblock, in order to maximize compression efficiency and subjective quality.

Furthermore, the H.264 standard also supports INTRA, SKIP and DIRECT modes. Intra modes allow three types: INTRA4×4, INTRA16×16, and INTRA8×8 which is a Fidelity Range extensions mode only. INTRA4×4 and INTRA8×8 support 9 prediction modes: vertical; horizontal; DC; diagonal down/left; diagonal down/right; vertical-left; horizontal-down; vertical-right; and horizontal-up prediction. INTRA16×16 supports 4 prediction modes: vertical; horizontal; DC; and plane prediction.

Multiple reference pictures may be used for inter-prediction, with a reference picture index coded to indicate which of the multiple reference pictures is used. In P pictures (or P slices), only single directional prediction is used, and the allowable reference pictures are managed in list 0. In B pictures (or B slices), two lists of reference pictures are managed, list 0 and list 1. In B pictures (or B slices), single directional prediction using either list 0 or list 1 is allowed, or bi-prediction using both list 0 and list 1 is allowed. When bi-prediction is used, the list 0 and the list 1 predictors are averaged together to form a final predictor.

Thus, in the H.264 standard, four different types of inter-picture predictions are supported for B slices: list 0, list 1, bi-predictive, and direct prediction. While list 0 prediction indicates that the prediction is based on a picture of the first reference picture buffer, a picture of the second reference picture buffer is used for the prediction if list 1 prediction is used. In the bi-predictive mode, the prediction signal is built by using both list 0 and list 1 prediction signal. The direct prediction mode is inferred from previously transmitted syntax element(s) and can be either list 0 or list 1 prediction or bi-predictive. B slices allow various block partitions (more specifically 16×16, 16×8, 8×16, and 8×8 for a macroblock) to be used for predicting a 16×16 macroblock. Additionally, for each block partition, the prediction mode (list 0, list 1, bi-predictive) can be chosen separately. For a block coded in direct prediction, if no error signal is transmitted, then the coding is also referred to as SKIP mode and the block can be coded very efficiently.

For the H.264 standard, each macroblock partition may have an independent reference picture index, prediction type (list 0, list 1, bipred), and an independent motion vector. Each sub-macroblock partition may have independent motion vectors, but all sub-macroblock partitions in the same sub-macroblock use the same reference picture index and prediction type.

For inter-coded macroblocks, besides the above macroblock partition, P frame also supports SKIP mode, while B frame supports both SKIP mode and DIRECT mode. In SKIP mode, no motion and residual information are encoded. The motion information for a SKIP macroblock is the same as a motion vector predictor specified by the picture/slice type (P or B), and other information such as sequence and slice level parameters, and is related to other temporally or spatial adjacent macroblocks and its own macroblock position within the slice. In contrast, in DIRECT mode, no motion information is encoded, but prediction residue is encoded. Both macroblocks and sub-macroblocks support DIRECT mode.

As for mode decision, inter pictures need to support both inter and intra modes. Intra modes include INTRA4×4 and INTRA16×16. For P pictures, inter modes include SKIP and 16×16, 16×8, 8×16 and sub-macroblock 8×8 partitions. 8×8 further supports 8×8, 8×4, 4×8 and 4×4 partitions. For B pictures, both list 0 and list 1 and DIRECT mode are considered for both macroblocks and sub-macroblocks.

In the prior art, a Rate-Distortion Optimization (RDO) framework is used for mode decision. For inter modes, motion estimation is separately considered from mode decision. Motion estimation is first performed for all block types of inter modes, then the mode decision is made by comparing the cost of each inter mode and intra mode. The mode with the minimal cost is selected as the best mode.

A conventional procedure to encode one macroblock s in a P- or B-picture (hereinafter the "conventional macroblock encoding procedure") is summarized as follows.

In a first step of the conventional macroblock encoding procedure, given the last decoded pictures, the Lagrangian multiplier $\lambda_{MODE}$, $\lambda_{MOTION}$, and the macroblock quantizer QP.

In a second step of the conventional macroblock encoding procedure, motion estimation and reference picture selection are performed by minimizing $$J(REF, m(REF) | \lambda_{MOTION}) = SA(T)D(s, c(REF, m(REF))) + \lambda_{MOTION}(R(m(REF) - p(REF)) + R(REF))$$

for each reference picture and motion vector of a possible macroblock mode. In the preceding equation, m is the current motion vector being considered, REF denotes the reference picture, p is the motion vector used for the prediction during motion vector coding, c(REF, m(REF)) is the candidate macroblock that is determined by REF, m(REF), R(m-p) represents the bits used for coding motion vector and R(REF) is the bits for coding reference picture. SA(T)D denotes the Sum of Absolute (Transform) Differences between the original signal and the reference signal predicted by the motion vector.

In a third step of the conventional macroblock encoding procedure, the macroblock prediction mode is chosen by minimizing $J(s,c,MODE|QP,\lambda_{MODE})=SSD(s,c,MODE|QP)+\lambda_{MODE} \cdot R(s,c,MODE|QP)$, given QP and $\lambda_{MODE}$ when varying MODE. SSD denotes the Sum of Square Differences between the original signal and the reconstructed signal. R(s,c,MODE) is the number of bits associated with choosing MODE, including the bits for the macroblock header, the motion and all DCT coefficients. MODE indicates a mode out of the set of potential macroblock modes:

$$P\text{-frame:} \quad MODE \in \left\{ \begin{array}{c} INTRA4\times4, INTRA16\times16, SKIP, \\ 16\times16, 16\times8, 8\times16, 8\times8, 8\times4, 4\times8, 4\times4 \end{array} \right\},$$

$$B\text{-frame:} \quad MODE \in \left\{ \begin{array}{c} INTRA4\times4, INTRA16\times16, BIDIRECT, DIRECT, \\ FWD16\times16, FWD16\times8, FWD8\times16, FWD8\times8, \\ FWD8\times4, FWD4\times8, FWD4\times4, BAK16\times16, \\ BAK16\times8, BAK8\times16, BAK8\times8, BAK8\times4, \\ BAK4\times8, BAK4\times4 \end{array} \right\}.$$

The INTRA4×4 includes modes:

$$MODE \in \left\{ \begin{array}{c} \text{vertical, horizontal, DC, diagonal} - \text{down/left,} \\ \text{diagonal} - \text{down/right, vertical} - \text{left, horizontal} - \text{down,} \\ \text{vertical} - \text{right, horizontal} - \text{up} \end{array} \right\}$$

and INTRA16×16 includes modes: MODE ∈ {vetical,horizontal,DC,plane}.

With respect to the conventional macroblock encoding procedure, a conventional fast mode selection was introduced which could considerably reduce the complexity of mode decision while having little impact in quality by considering that the mode decision error surface is more likely to be monotonic and therefore if certain modes are examined first it might be simpler to find the best mode. If mode decision for a given mode is not performed, then this essentially implies that motion estimation also is not performed, the latter being the most costly part of encoding even if a fast motion estimation algorithm is used. More specifically, in this approach SKIP and 16×16 modes were examined first. According to their distortion relationship (i.e. (J(SKIP)<J(16×16)) and the availability of residual, a further decision was made whether or not to terminate the search. Otherwise, J(8×8) and J(4×4) were also computed. Based on the relationship of J(16×16), J(8×8), and J(4×4), additional decisions were made to determine which of the remaining block sizes should be tested. For example, if the distortion is monotonic (i.e., J(16×16)>J(8×8)>J(4×4) or J(16×16)<J(8×8)<J(4×4)), then it determined which additional partitions should be examined. For the first case, for example, only small partitions (8×4 and 4×8) are tested, while in the second case only 16×8 and 8×16 are examined. If the distortion is not monotonic, then all possible modes are tested.

In a different conventional fast mode decision approach, additional conditions were introduced based on the distortion values (see FIG. 1) and the relationships between different modes (see FIG. 2), which allowed the search to terminate even faster without much impact in quality.

Turning to FIG. 1, a method for motion vector and mode decision based on distortion values is generally indicated using the reference numeral 100. The method 100 includes a start block 102 that passes control to a function block 104. The function block 104 checks SKIP mode and 16×16 mode, and passes control to a decision block 106. The decision block 106 determines whether or not the distortion in SKIP mode, J(SKIP), is less than the distortion in 16×16 mode, J(16×16), and whether or not 16×16 mode has any residue. If the distortion in SKIP mode is not less than the distortion in 16×16 mode and/or 16×16 mode has a residue, then control is passed to a function block 108. Otherwise, if the distortion in SKIP mode is less than the distortion in 16×16 mode and 16×16 mode has no residue, then control is passed to a decision block 126.

The function block 108 checks 8×8 mode for a current (i.e., currently evaluated) 8×8 sub-partition, and passes control to a decision block 110 and to a function block 114. The decision block 110 determines whether or not 8×8 mode has the same motion information as 16×16 mode for the current 8×8 sub-partition. If 8×8 mode does not have the same motion information as 16×16 mode for the subject sub-partition, then control is passed to a function block 112. Otherwise, if 8×8 mode has the same motion information as 16×16 mode for the current 8×8 sub-partition, then control is passed to a function block 114.

The function block 112 checks 16×8 and 8×16 sub-partitions, and passes control to function block 114.

The function block 114 checks 4×4 mode for a current 4×4 sub-partition, and passes control to a decision block 116 and to a function block 120. The decision block 116 determines whether or not 4×4 mode has the same motion information as 8×8 mode for the current 4×4 sub-partition. If 4×4 mode does not have the same motion information as 8×8 mode for the current 4×4 sub-partition, then control is passed to a function block 118. Otherwise, if 4×4 mode has the same motion information as 8×8 mode for the current 4×4 sub-partition, then control is passed to a function block 120.

The function block 118 checks 8×4 and 4×8 sub-partitions, and passes control to function block 120.

The function block 120 checks intra modes, and passes control to a function block 122. The function block 122 selects the best mode from among the evaluated modes, and passes control to an end block 124. The end block 124 ends the macroblock encoding.

The decision block 126 determines whether or not SKIP mode has the same motion information as 16×16 mode for a current (i.e., currently evaluated) 16×16 MB. If SKIP mode does not have the same motion information as 16×16 mode for the current 16×16 MB, then control is passed to decision block 108. Otherwise, if SKIP mode has the same motion information as 16×16 mode for the current 16×16 MB, then control is passed to function 120.

Turning to FIG. 2, a method for motion vector and mode decision based on relationships between different modes is generally indicated using the reference numeral 200. The method 200 includes a start block 202 that passes control to a function block 204. The function block 204 checks SKIP mode and 16×16 mode, and passes control to a decision block 206. The decision block 206 determines whether or not MC2>T1, where MC2=min(J(SKIP), J(16×16)), the minimum distortion between SKIP mode and 16×16 mode, and T1 is the first threshold. If MC2<=T1, then control is passed to a decision block 208. Otherwise, if MC2=min(J(SKIP), J(16×16))>T1, then control is passed to a function block 210.

The decision block 208 determines whether or not MC2 is greater than T2 (a second threshold). If MC2 is not greater than T2, then control is passed to function block 210. Otherwise, if MC2 is greater than T2, then control is passed to a function block 218.

The function block 210 checks other inter modes, and passes control to a function block 212. The function block 212 checks other non-tested intra modes, and passes control to a function block 214. The function block 214 selects the best mode from among the evaluated modes, and passes control to an end block 216. The end block 216 ends the macroblock encoding.

The function block 218 checks the intra4×4 DC, and passes control to a decision block 220. The decision block 220 determines whether or not J(INTRA4×4 DC) is less than a*MC2+b, where a and b are constant. If J(INTRA4×4 DC) is not less than a*MC2+b, then control is passed to function block 210 and function block 212. Otherwise, if J(INTRA4×4 DC) is less than a*MC2+b, then control is passed to the function block 212.

Inter mode decision is associated with motion estimation, various block sizes and multiple reference picture selection. Intra mode decision is associated with various block types and multiple spatial prediction mode selection. Therefore, mode decision for interframes incurs a big burden on the encoder.

Accordingly, it would desirable and highly advantageous to have a method and apparatus for performing a fast mode decision for interframes that lessens the burden on the encoder.

SUMMARY OF THE INVENTION

These and other drawbacks and disadvantages of the prior art are addressed by the present invention, which is directed to a method and apparatus for fast mode decision of B-frames for an encoder.

According to an aspect of the present invention, there is provided a video encoder for encoding video data for a B slice that is divisible into macroblocks. The video encoder includes an encoder for performing mode selection when encoding a current macroblock in the B slice by counting a number of neighboring macroblocks in the B slice coded in a DIRECT mode, and only checking one of the DIRECT MODE or a 16×16 mode for the current macroblock when the number of neighboring macroblocks coded in the DIRECT mode exceeds a predetermined threshold.

According to another aspect of the present invention, there is provided a video encoder for encoding video data for a B slice that is divisible into macroblocks. The video encoder includes an encoder for performing mode selection when encoding a current macroblock in the B slice, by calculating a residue energy of the current macroblock using a number of block transform coefficients in the current macroblock, and comparing a value of the residue energy to a predetermined threshold, and considering only inter modes for the mode selection when the value of the residue energy is less than the predetermined threshold.

According to yet another aspect of the present invention, there is provided a video encoder for encoding video data for a B slice that is divisible into macroblocks. The video encoder includes an encoder for performing a multi-stage mode selection when encoding a current macroblock in the B slice, using a plurality of trained thresholds with multiple video sequences and fitted to a model that is linear with respect to $\lambda_{MODE}$, where $\lambda_{MODE}$ is quantization parameter dependent, and comparing a Rate-Distortion (RD) cost to the plurality of trained thresholds when coding in DIRECT mode, and terminating the mode selection at different stages based on the RD cost.

According to still another aspect of the present invention, there is provided a video encoder for encoding video data for a B slice that is divisible into macroblocks. The video encoder includes an encoder for performing mode selection when encoding a current macroblock in the B slice by initially performing single prediction for list 0 and list 1, and determining whether to test a bi-prediction mode for the current macroblock based on a best mode decision for list 0 and list 1.

According to a further aspect of the present invention, there is provided a video encoder for encoding video data for a B slice that is divisible into macroblocks. The video encoder includes an encoder for performing mode selection when encoding a current macroblock in the B slice, by only testing DIRECT8×8 mode for sub-macroblock mode selection.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which:

FIG. 4 shows a flow diagram for a method for fast mode decision using mode information of neighboring macroblocks and residue in accordance with the principles of the present invention;

FIG. 5 shows a flow diagram for a method for fast mode decision using distortion information in accordance with the principles of the present invention.

DETAILED DESCRIPTION

Figure 1:
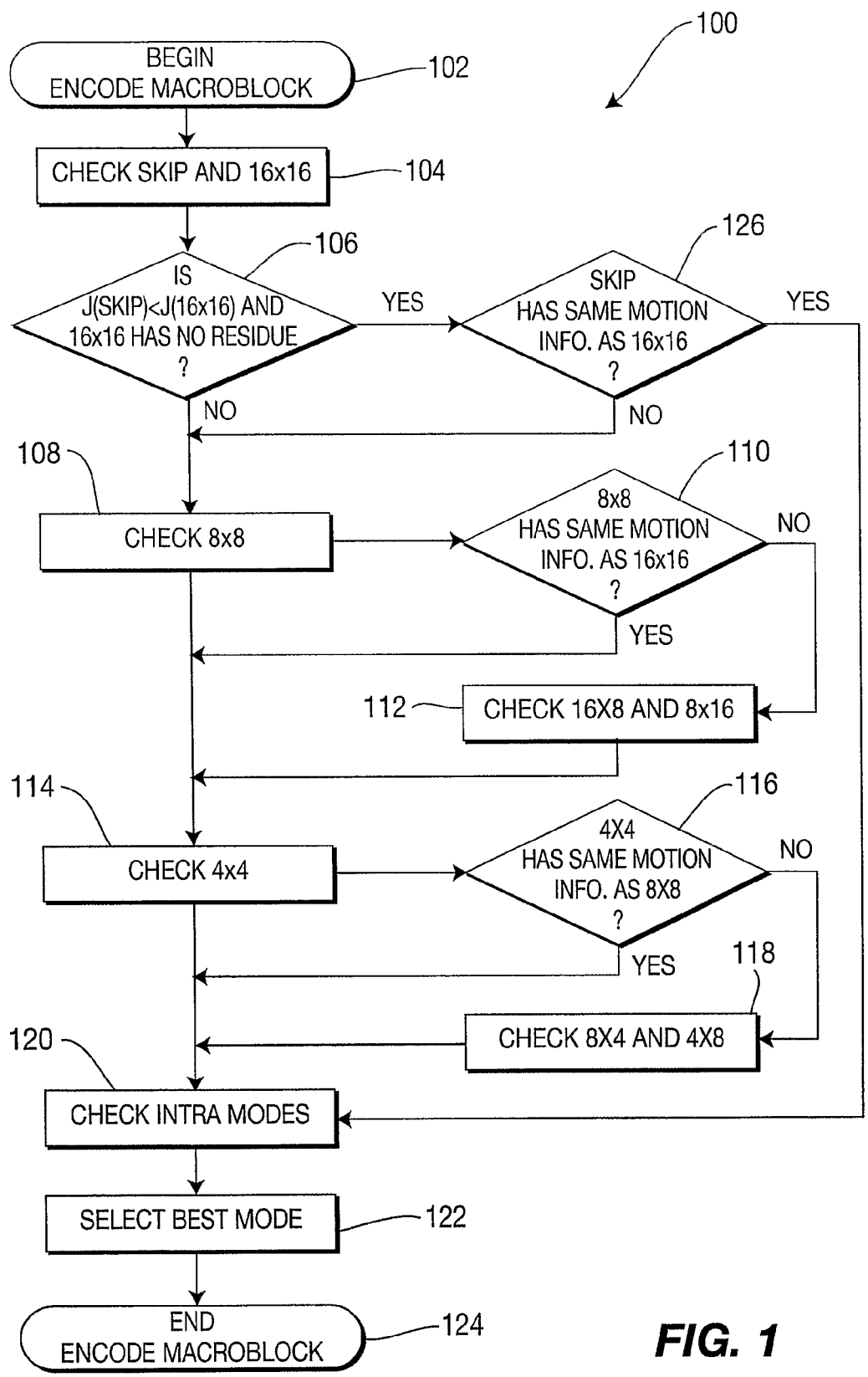
FIG. 1 shows a flow diagram for a method for motion vector and mode decision based on distortion values.
Figure 2:
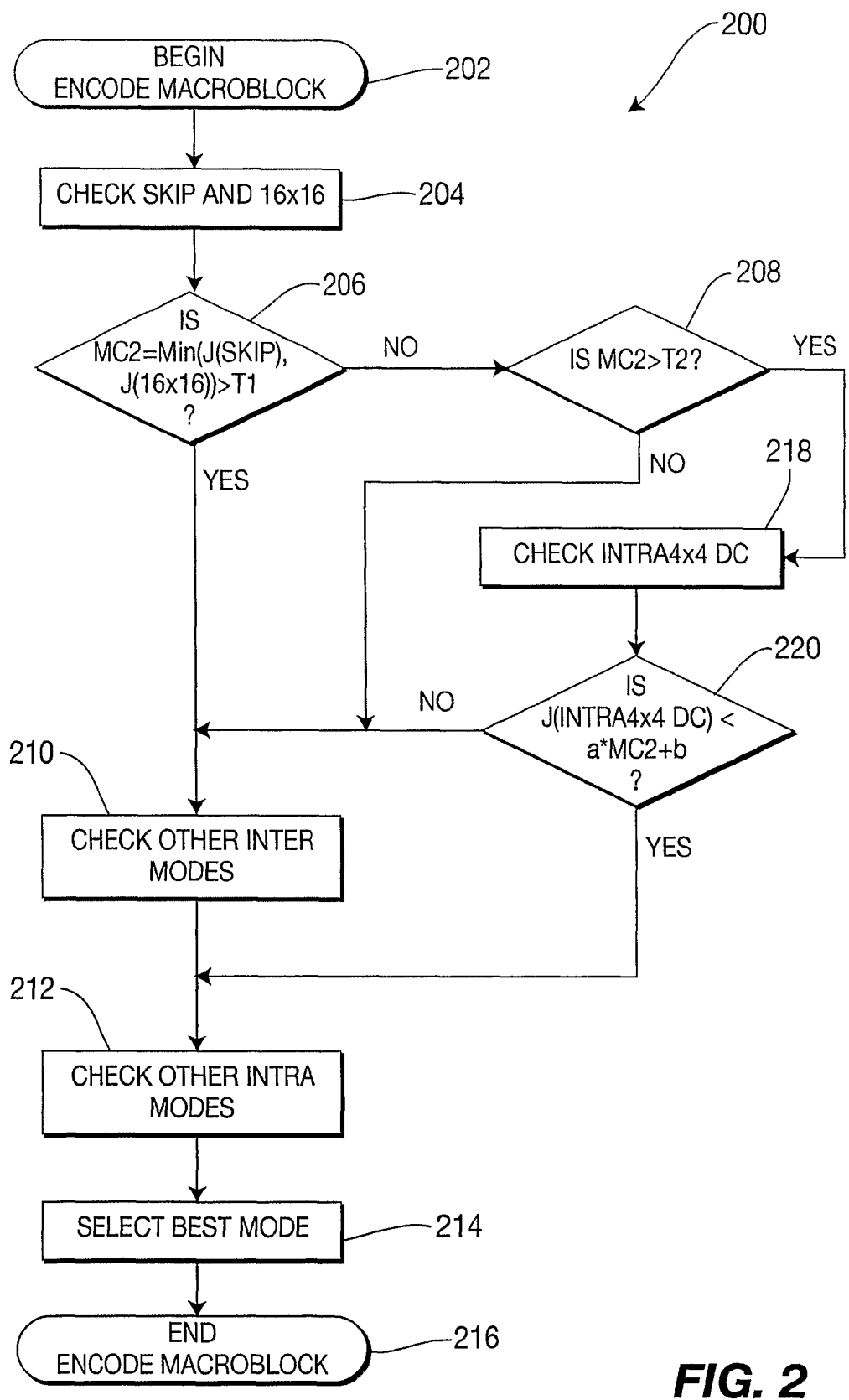
FIG. 2 shows a flow diagram for a method for motion vector and mode decision based on relationships between different modes.

The present invention is directed to a method and apparatus for fast mode decision of B-frames for an encoder. Advantageously, the present invention reduces mode decision complexity while maintaining coding efficiency.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Advantageously, the present invention provides a method and apparatus for fast mode decision of B-frames (or B-slices) for an encoder that reduces mode decision complexity while maintaining coding efficiency.

As an example, in one exemplary embodiment of the present invention, the complexity of mode decision for B-frames (or B-slices) is reduced by utilizing information available from previous coded macroblocks including, but not limited to, distortion, mode and residue, to determine which modes need to be checked for a current macroblock. The order of the modes to be tested may optionally be as follows: DIRECT, 16×16, 8×8, 16×8, 8×16, 8×8 sub-macroblock partitions and INTRA modes.

Figure 3:
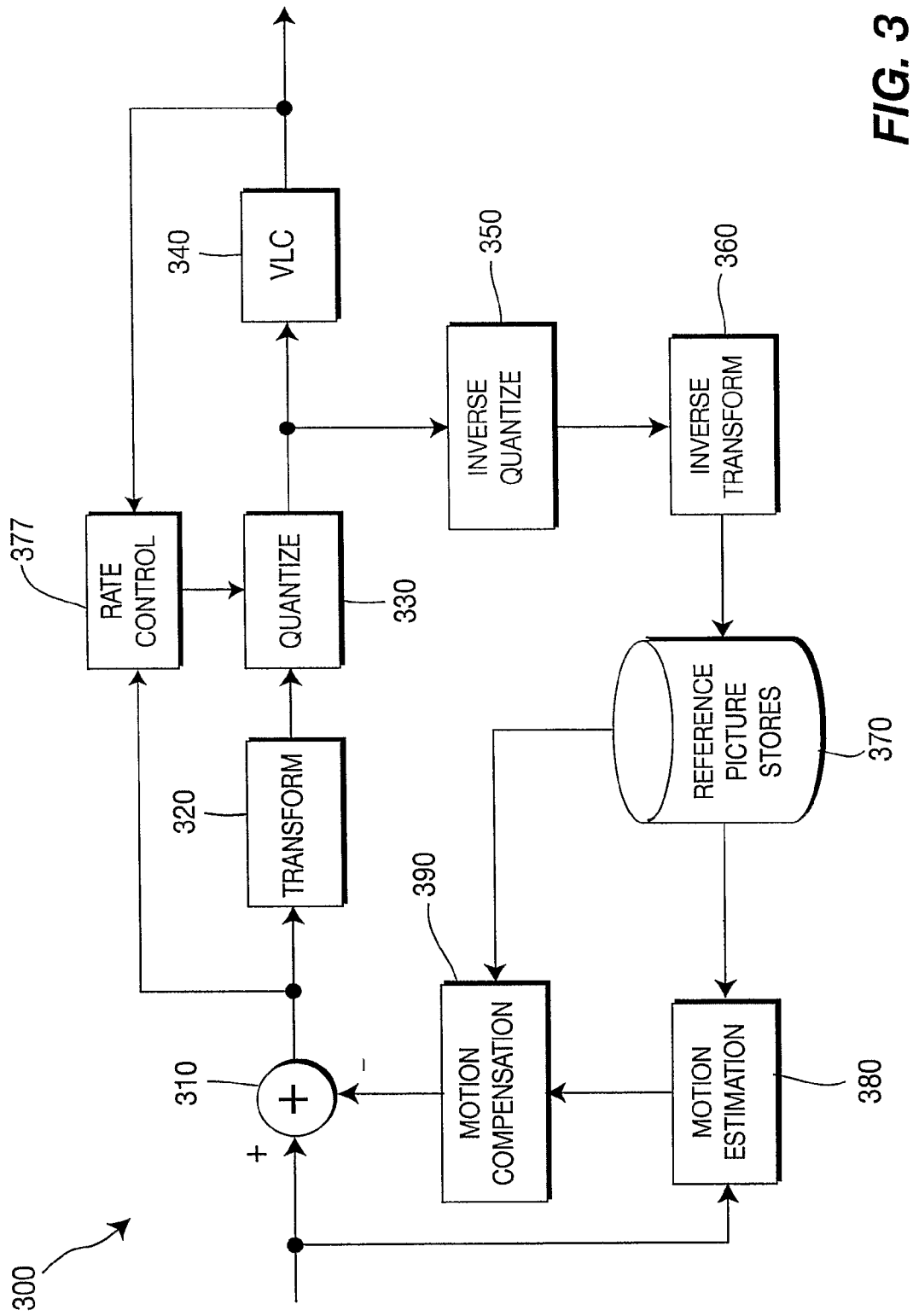
FIG. 3 shows a video encoder in accordance with the principles of the present invention.

Turning to FIG. 3, an exemplary video encoder is indicated generally by the reference numeral 300.

An input to the encoder 300 is connected in signal communication with a non-inverting input of a summing junction 310. The output of the summing junction 310 is connected in signal communication with a block transformer 320. The transformer 320 is connected in signal communication with a first input of a quantizer 330. The output of the quantizer 330 is connected in signal communication with a variable length coder ("VLC") 340, where the output of the VLC 340 is an externally available output of the encoder 300. A first input of a rate controller 377 is connected in signal communication with the output of the summing junction 310, a second input of the rate controller 377 is connected in signal communication with the output of the VLC 340, and an output of the rate controller 377 is connected in signal communication with a second input of the quantizer 330.

The output of the quantizer 330 is further connected in signal communication with an inverse quantizer 350. The inverse quantizer 350 is connected in signal communication with an inverse block transformer 360, which, in turn, is connected in signal communication with a reference picture store 370. A first output of the reference picture store 370 is connected in signal communication with a first input of a motion estimator 380. The input to the encoder 300 is further connected in signal communication with a second input of the motion estimator 380. The output of the motion estimator 380 is connected in signal communication with a first input of a motion compensator 390. A second output of the reference picture store 370 is connected in signal communication with a second input of the motion compensator 390. The output of the motion compensator 390 is connected in signal communication with an inverting input of the summing junction 310.

A description will now be given regarding using mode information for neighboring macroblocks of a current macroblock subject to fast mode decision in accordance with the principles of the present invention.

It is observed that for B frames, if all neighboring macroblocks are coded in DIRECT modes, then the current macroblock is most likely to be coded in either DIRECT mode or 16×16 mode. An example of such an implementation can be seen in FIG. 4, which is described herein below. This method can also be applied to P frames. When all neighboring modes are coded in SKIP mode, a macroblock in P frame only needs to test SKIP and 16×16 mode.

The above approach may be readily varied to adapt to different coding performance by setting a threshold $T_{direct}$. To implement this adaptive approach, the number of neighboring blocks coded in the DIRECT mode is counted, and only DIRECT mode and 16×16 mode are checked for the current macroblock when the number of neighboring blocks encoded as DIRECT exceeds the threshold. The threshold is set to a smaller value when high coding speed is preferred. On the other hand, to design a coder with little loss, the threshold can be set to the number of all available neighboring blocks.

A description will now be given regarding using residue information for fast mode decision in accordance with the principles of the present invention.

The energy of the residue is used to measure the performance of DIRECT mode. The residue is the difference between the original signal and the reference signal, which can be simply computed as the sum of the absolute value of the block transform coefficients, or as the number of block transform coefficients in the current macroblock. When the residue is zero or smaller than a threshold $T_{residue}$ after DIRECT mode is tested, this macroblock is well predicted from previous pictures and there is no need to check INTRA modes.

Turning to FIG. 4, a method for performing mode decision using mode information of neighboring macroblocks and residue is indicated generally using the reference numeral 400.

The method 400 includes a start block 405 that passes control to a function block 410. The function block 410 checks DIRECT mode, and passes control to a function block

415. The function block 415 checks 16×16 mode, and passes control to a decision block 420. The decision block 420 determines whether or not the number of neighboring blocks coded in DIRECT MODE is greater than or equal to $T_{direct}$. If the number of neighboring blocks coded in DIRECT MODE is not greater than or equal to $T_{direct}$, then control is passed to a function block 425. Otherwise, if the number of neighboring blocks coded in DIRECT MODE is greater than or equal to $T_{direct}$, then control is passed to a function block 440.

The function block 425 checks 16×8 mode, 8×16 mode, and 8×8 mode, and passes control to a decision block 430. The decision block 430 determines whether or not the residue after DIRECT mode is less than $T_{residue}$. If the residue after DIRECT mode is not less than $T_{residue}$, then control is passed to a function block 435. However, if the residue after DIRECT mode is less than $T_{residue}$, then control is passed to a function block 440.

The function block 435 checks INTRA modes, and passes control to function block 440.

The function block 440 selects the best mode among the tested modes, and passes control to an end block 445.

A description will now be given regarding using distortion information for fast mode decision in accordance with the principles of the present invention.

It is to be appreciated that the term "error" and the phrase "rate distortion cost" are used interchangeably herein, and may also be represented herein preceded by the letter "J", wherein a corresponding mode is indicated in parenthesis after the letter "J".

The error after the DIRECT mode is tested, J(DIRECT), is used as an indicator of whether a current macroblock is well predicted from the previous picture using the DIRECT mode. If J(DIRECT) is below a threshold $T_{B1}$, then the current macroblock is very likely to be represented efficiently by the DIRECT mode and no other modes need to be examined. Otherwise, if J(DIRECT) is less than $T_{B2}$, then the mode 16×16 will also be tested. Otherwise, if J(DIRECT) is less than $T_{B3}$, then modes 16×16, 16×8 and 8×16 will be tested. Otherwise, if J(DIRECT) is less than $T_{B4}$, then modes 16×16, 16×8, 8×16, and 8×8 will be tested. If J(DIRECT) is larger than $T_{B4}$, all modes will be tested. This is illustrated in FIG. 5, which is described herein below.

The thresholds are trained by using multiple video sequences representing different types of video content. The strictest thresholds are selected to guarantee that all sequences maintain good coding efficiency. The thresholds vary when video sequences are coded at different quantization parameters. For example, when a higher QP is used, the distortion between the reconstructed macroblock and the original one is larger and, hence, the thresholds should be also larger. For this reason, the thresholds are QP dependent. Further, it is observed that those thresholds are almost linear to $\lambda_{MODE}$, where $\lambda_{MODE}$ is QP dependent. This linearity is written as $T_{Bi}=a_i+b_i\lambda_{MODE}$, $i=1,2,3,4$.

The thresholds are also applied to J(16×16) and J(8×8), after modes 16×16 and 8×8 are tested. Further, the absolute difference between different modes is considered, such as |J(DIRECT)−J(16×16)| and |J(16×16)−J(8×8)|. If this difference is very small, together with other conditions, the examination of some modes may be skipped. For example, if |J(DIRECT)−J(16×16)|, and the motion information from both the DIRECT mode and the 16×16 mode are the same, the mode decision process is terminated and the best mode is selected between the DIRECT mode and the 16×16 mode. On the other hand, if |J(16×16)−J(8×8)| is small, then 16×8 mode and 8×16 mode may be skipped, and the best mode selected from among DIRECT mode (SKIP mode for P slices), 16×16 mode, and 8×8 mode.

B slices support four different types of inter-picture predictions: list 0, list 1, bi-predictive, and direct prediction. The distortion information can also be used to reduce one or more types of predictions. For example, when the distortion by list 0 or list 1 is already smaller than a threshold, $T_{bi-pred}$, this indicates that single directional prediction performs very well, and the test for bi-predictive prediction may be skipped and the mode decision process terminated. Further, after both list 0 and list 1 are examined, the best macroblock partition for both list 0 and list 1 is obtained. If the partition is the same, bi-predictive prediction is examined on this partition. Otherwise, bi-predictive prediction is skipped on this partition.

Considering that several encoders may also include a preprocessing element, such as content analysis, or even an MPEG-2 encoder in the transcoding architecture, it is proposed that if such element is available, the threshold is adapted to different sequences with different content textures instead of selecting the threshold based on the sequence that is most difficult to be coded.

Turning to FIG. 5, a method for performing mode decision using distortion information is indicated generally using the reference numeral 500.

The method 500 includes a start block 505 that passes control to a function block 510. The function block 510 calculates the RD cost by "16×16 DIRECT", J(DIRECT), and passes control to a decision block 515. The decision block 515 determines whether or not J(DIRECT) is less than $T_{B1}$. If J(DIRECT) is not less than $T_{B1}$, then control is passed to a function block 520. Otherwise, if J(DIRECT) is less than $T_{B1}$, then control is passed to an end block 560.

The function block 520 checks 16×16 mode, and passes control to a decision block 525. The decision block 525 determines whether or not J(DIRECT) is less than $T_{B4}$. If J(DIRECT) is not less than $T_{B2}$, then control is passed to a function block 530. Otherwise, if J(DIRECT) is less than $T_{B2}$, then control is passed to end block 560.

The function block 530 checks 16×8 mode and 8×16 mode, and passes control to a decision block 535. The decision block 535 determines whether or not J(DIRECT) is less than $T_{B3}$. If J(DIRECT) is not less than $T_{B3}$, then control is passed to a function block 540. Otherwise, if J(DIRECT) is less than $T_{B3}$, then control is passed to end block 560.

The function block 540 checks 8×8 mode, and passes control to a decision block 545. The decision block 545 determines whether or not J(DIRECT) is less than $T_{B4}$. If J(DIRECT) is not less than $T_{B4}$, then control is passed to a function block 550. Otherwise, if J(DIRECT) is less than $T_{B4}$, then control is passed to end block 560.

The function block 550 checks INTRA modes, and passes control to a function block 555. The function block 555 selects the best mode from among the test modes, and passes control to end block 560.

A description will now be given regarding using statistics for 8×8 mode for fast mode decision in accordance with the principles of the present invention.

An 8×8 partition of a B-slice macroblock can also be coded in DIRECT mode. This mode is also called DIRECT8×8 mode. It is observed from statistics that the possibility of a macroblock coded in the 8×8 mode is very small, and when it is coded in 8×8 mode, there is a significant chance that it is coded in the DIRECT mode. Therefore, all 8×8 partitions may be coded in DIRECT mode without losing much coding efficiency.

It is to be appreciated that the methods described herein with respect to FIGS. 4 and 5, and the methods described with respect to the conventional macroblock encoding procedure and the different conventional approach that employed additional conditions based on distortion values and the relationships between different modes that are described herein above, may be used separately or jointly.

Figure 6:
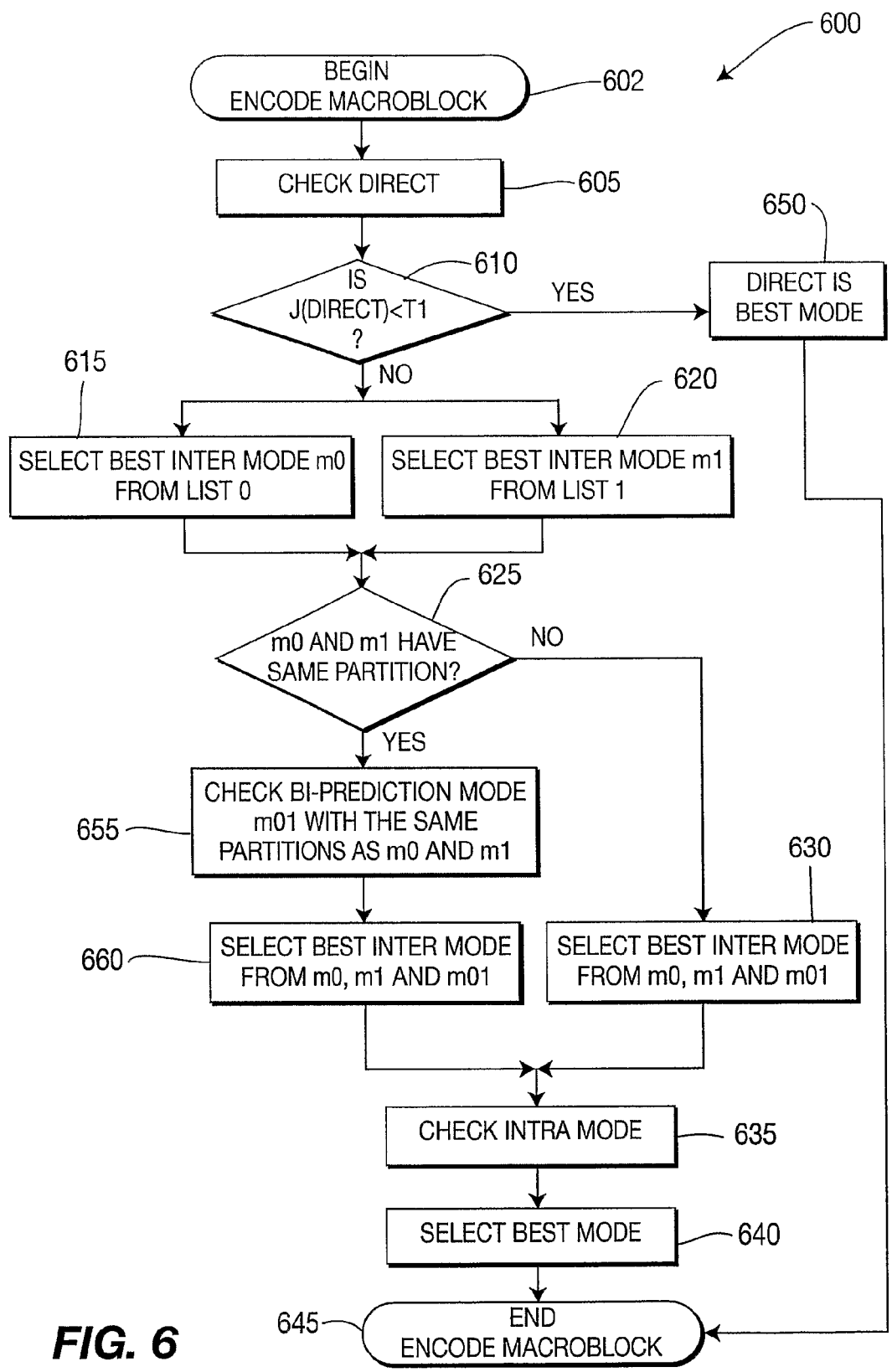
FIG. 6 shows a flow diagram for a method for fast mode decision using list information in accordance with the principles of the present invention.

Turning to FIG. 6, a method for fast mode decision using list information is indicated generally by the reference numeral 600.

A begin block 602 passes control to a function block 605. The function block 605 checks DIRECT mode, and passes control to a decision block 610. The decision block 610 determines whether or not J(DIRECT) is less than T1. If J(DIRECT) is not less than T1, then control is passed to a function block 615 and a function block 620. Otherwise, if J(DIRECT) is less than T1, then control is passed to a function block 650.

The function block 615 selects the best inter mode m0 from list 0, and passes control to a decision block 625. The function block 620 selects the best inter mode m1 from list 1, and passes control to decision block 625.

The decision block 625 determines whether or not inter mode m0 and inter mode m1 have the same partition. If inter mode m0 does not have the same partition as inter mode m1, then control is passed to a function block 630. Otherwise, if inter mode m0 has the same partition as inter mode m1, the control is passed to a function block 655.

The function block 630 selects the best inter mode from m0, m1, and m01, and passes control to a function block 635.

The function block 635 checks intra mode, and passes control to a function block 640. The function block 640 selects the best mode from among the tested modes, and passes control to an end block 645.

The function block 655 checks bi-prediction mode m01 with the same partition as m0 and m1, and passes control to a function block 660. The function block 660 selects the best inter mode from m0, m1, and m01, and passes control to function block 635.

A description will now be given of some of the many attendant advantages/features of the present invention. For example, one advantage/feature is a video encoder that performs mode selection when encoding a macroblock in a B slice, by counting the number of neighboring macroblocks coded in direct mode, and only checking DIRECT mode or 16×16 mode for the current macroblock when the number of neighboring macroblocks encoded as DIRECT exceeds a predetermined threshold. Another advantage/feature is a video encoder as described above, wherein the neighboring macroblocks considered are the left, upper left, upper, and upper right neighbors. Yet another advantage/feature is a video encoder that considers the above-specified neighboring macroblocks as described above, wherein the predetermined threshold is that all neighbors must be coded as DIRECT. Still another advantage/feature is a video encoder as described above, wherein if the predetermined threshold is not exceeded, then further mode selection is performed. Moreover, another advantage/feature is a video encoder that performs mode selection when encoding a macroblock in a B slice, by calculating the residue energy using the number of block transform coefficients in the current macroblock, and comparing the value of the residue energy to a predetermined threshold and, if the value is less than the predetermined threshold, not considering INTRA modes in the mode selection process. Further, another advantage/feature is a video encoder that performs mode selection using the residue energy as described above, wherein the value of the predetermined threshold is zero. Also, another advantage/feature is a video encoder that performs mode selection when encoding a macroblock in a B slice, by training thresholds $T_{B1}$, $T_{B2}$, $T_{B3}$, and $T_{B4}$ using multiple video sequences and fitting them to a model which is linear to $\lambda_{MODE}$, where $\lambda_{MODE}$ is QP dependent, and comparing the RD cost when coding in DIRECT mode to the thresholds, and terminating the mode selection at different stages based on the RD cost. Additionally, another advantage/feature is a video encoder that performs mode selection when encoding a macroblock in a B slice by performing single prediction for list 0 and list 1 first, and wherein the choice of testing bi-prediction mode is dependent on the best mode decision for list 0 and list 1. Yet another advantage/feature is a video encoder that first performs single prediction for list 0 and list 1, wherein if mode selection for list 0 and list 1 has the same partition, then bi-prediction mode on this partition will be tested; otherwise, no bi-prediction is performed. Further, another advantage/feature is a video encoder that performs mode selection when encoding a macroblock in a B slice by only testing DIRECT8×8 mode for sub-macroblock mode selection.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus for encoding video data for a bi-predictive (B) slice that is divisible into macroblocks, comprising an encoder for performing a multi-stage mode selection when encoding a current macroblock in the B slice, using a plurality of trained thresholds with multiple video sequences and fitted to a model that is linear with respect to $\lambda_{MODE}$, where $\lambda_{MODE}$ is quantization parameter dependent, and comparing a rate distortion cost to the plurality of trained thresholds when coding in direct mode, and terminating the mode selection at different stages based on the rate distortion cost.

2. A method for encoding video data for a bi-predictive (B) slice that is divisible into macroblocks, comprising the step of performing a multi-stage mode selection when encoding a current macroblock in the B slice, using a plurality of trained thresholds with multiple video sequences and fitted to a model that is linear with respect to $\lambda_{MODE}$, where $\lambda_{MODE}$ is quantization parameter dependent, and comparing a rate distortion cost to the plurality of trained thresholds when coding in direct mode, and terminating the mode selection at different stages based on the rate distortion cost.

* * * * *